UNITED STATES PATENT OFFICE.

JESUS M. MENDEZ, OF DELRIO, TEXAS.

MEDICAL COMPOUND.

No. 829,986.  Specification of Letters Patent.  Patented Sept. 4, 1906.

Application filed December 4, 1905. Serial No. 290,269.

*To all whom it may concern:*

Be it known that I, JESUS M. MENDEZ, a citizen of the United States of America, residing at Delrio, in the county of Valverde and State of Texas, have invented certain new and useful Improvements in Medical Compounds, of which the following is a specification.

This invention relates to new and useful improvements in medical compounds, and relates more particularly to a compound which, when taken internally, is a cure for gonorrhea, gravel, dysentery, and diarrhea, and when applied externally a cure for rheumatism.

The composition comprises the following ingredients: Limonsillo, (*Pectis*, species,) huayacan, (*Porliera angustifolia*,) gobernadora, (*Covillea tridentata (D. C.) Vail* or *Larrea tridentata, D. C.*)  Water.

When used for different diseases the proportions vary; but the above-named ingredients are used for all the above-mentioned forms of disease.

When used for gonorrhea or gravel, the compound is mixed as follows: One-half pound limonsillo, four ounces huayacan, one ounce gobernadora, one-half gallon water. The compound is boiled until it is reduced to one-fourth of a gallon.

When used for dysentery, the compound is mixed as follows: four ounces limonsillo, two ounces huayacan, one-half ounce gobernadora, one-fourth gallon water.

The above compound is heated until it commences to boil, when it is allowed to cool.

When used for diarrhea, the compound is mixed as follows: One-half ounce limonsillo, one-half ounce gobernadora, one-half ounce huayacan, one-half gallon water. The herbs are mashed in the water and allowed to settle.

For rheumatism the compound is mixed as follows: One-half pound limonsillo, one-half pound huayacan, one-half pound gobernadora, one gallon water. The above compound is boiled until it is reduced to one-fourth gallon, when it is allowed to cool.

A dose for gonorrhea and gravel is one teaspoonful every four hours, and it has been found in practice that a cure will be effected in less than four days A dose for dysentery is two teaspoonfuls every fifteen (15) minutes. Three doses have been found sufficient to effect a cure.

A dose for diarrhea is a glassful. One dose has generally been sufficient to effect a cure, but if it should prove ineffective repeat the dose after a lapse of a half-hour.

For rheumatism the preparation is applied lukewarm to the affected parts twice a day, covering the parts with a woolen cloth.

In preparing aforesaid composition the leaves of the plants are employed, and they can be used equally well green or dried. The leaves are placed in a vessel as per formula and boiled, after which they are allowed to cool. The liquid is separated from the solid residue by filtration.

Having thus fully described my invention, what I claim as new, and desire to secure by Letters Patent, is—

A decoction of a mixture of the leaves of a species of *Pectis*, of *Porliera angustifolia*, and of *Covillea tridentata* in substantially equal proportions.

In testimony whereof I affix my signature in the presence of two witnesses this 18th day of November, 1905.

JESUS M. MENDEZ.

Witnesses:
A. F. DIGNOWITZ,
JESÚS M. OYALA.